(12) United States Patent
DiChiara, Jr.

(10) Patent No.: US 6,919,103 B2
(45) Date of Patent: Jul. 19, 2005

(54) SURFACE PROTECTION OF POROUS CERAMIC BODIES

(75) Inventor: Robert A. DiChiara, Jr., Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/927,175

(22) Filed: Aug. 10, 2001

(65) Prior Publication Data

US 2003/0032545 A1 Feb. 13, 2003

(51) Int. Cl.$^7$ .................................................. B05D 3/02
(52) U.S. Cl. ................................ 427/376.2; 427/430.1
(58) Field of Search ............................ 427/376.2, 430.1

(56) References Cited

U.S. PATENT DOCUMENTS

| | | |
|---|---|---|
| 4,093,771 A | 6/1978 | Goldstein et al. |
| 4,148,962 A | 4/1979 | Leiser et al. |
| 4,358,486 A | 11/1982 | Ecord et al. |
| 4,559,270 A | 12/1985 | Sara |
| 4,560,478 A | 12/1985 | Narumiya |
| 4,711,666 A | 12/1987 | Chapman et al. |
| 4,849,276 A | 7/1989 | Bendig et al. |
| 5,000,998 A | 3/1991 | Bendig et al. |
| 5,041,321 A | 8/1991 | Bendig |
| 5,103,239 A | 4/1992 | Verzemnieks et al. |
| 5,296,288 A * | 3/1994 | Kourtides et al. ........... 428/325 |
| 5,310,592 A * | 5/1994 | Baker et al. ................ 244/113 |
| 5,420,084 A | 5/1995 | Morel |
| 5,569,427 A | 10/1996 | Semenova et al. |
| 5,624,613 A | 4/1997 | Rorabaugh et al. |
| 5,702,761 A | 12/1997 | DiChiara, Jr. et al. |
| 5,856,015 A | 1/1999 | Buchanan |
| 5,928,775 A * | 7/1999 | DiChiara et al. ........ 428/312.2 |
| 5,939,141 A | 8/1999 | Cagliostro |
| 5,958,583 A | 9/1999 | Rorabaugh et al. |
| 5,980,980 A | 11/1999 | DiChiara, Jr. et al. |
| 6,007,026 A | 12/1999 | Shorey |
| 6,036,664 A | 3/2000 | Martin, Sr. et al. |
| 6,074,699 A | 6/2000 | Dichiara, Jr. et al. |
| 6,419,189 B1 | 7/2002 | DiChiara, Jr. et al. |

FOREIGN PATENT DOCUMENTS

| | | |
|---|---|---|
| EP | 0 696 650 A2 | 2/1996 |
| EP | 0 696 650 A3 | 4/1997 |
| JP | 04 046 080 | 2/1992 |
| KR | 9 511 098 | 9/1995 |
| SU | 1 622 348 | 1/1991 |

OTHER PUBLICATIONS

Database WPI, Section Ch, Week 199139, Derwent Publications Ltd., London, GB, AN 1991–286947; XP002248714.

European Search Report, EP 02 07 7824, Jul. 31, 2003 (partial).

* cited by examiner

*Primary Examiner*—Bret Chen
(74) *Attorney, Agent, or Firm*—Harness Dickey & Pierce P.L.C.

(57) ABSTRACT

A porous ceramic body protected by a damage resistant hardened surface, and a method for preparing the surface hardened ceramic body. The ceramic body is protected by applying to the surface a slurry composition containing a binding agent, particles of a ceramic material, at least one boron containing compound, and a solvent. The inclusion of at least one boron containing compound in the slurry provides for hardened surfaces that are stable to higher temperatures as compared to those of the prior art.

25 Claims, No Drawings

SURFACE PROTECTION OF POROUS CERAMIC BODIES

TECHNICAL FIELD

This invention relates to surface protection of porous ceramic bodies. More specifically, it relates to coatings resistant to high temperature for use in thermal insulating tiles.

BACKGROUND OF THE INVENTION

Ceramic tiles are widely used to insulate underlying structures against the high temperature encountered in some applications. Examples of such applications include commercial furnace fiber linings, back decks on aircraft, and surface tiles for vehicles like the space shuttle. An aerodynamic vehicle such as the space shuttle or a supersonic aircraft is heated by friction to high temperature as it flies through the air, and especially as it re-enters the atmosphere from orbit. To insulate the airframe structure from the high temperature resulting from frictional heating, a portion of the outside of the skin of the aircraft may be covered by ceramic insulation that can withstand those high temperatures.

The ceramic insulation normally consists of ceramic tiles affixed to the exterior of the skin, which in turn is supported on the airframe. During flight, the outer surface of the ceramic insulation tile is heated to an extremely high temperature, but the interior surface of the tile remains much cooler because of the poor thermal conductivity of the ceramic material.

One known type of ceramic insulation is a porous ceramic made by pressing together fibers of one or more ceramic materials. The fibrous, porous ceramic is resistant to damage from thermal shock and thermal cycling, but it is relatively soft and can be damaged by external impact and wear forces. It is known to apply coatings to such surfaces to harden them and reduce the risk of damage from flying dust and debris.

The art has addressed these issues in a variety of ways. For example, a number of solutions have been offered that involve adding a surface layer to the ceramic body. In U.S. Pat. No. 4,093,771, a composition containing a solvent carrier, finely divided particles of a reactive glass frit, and an intermetallic compound such as boron silicides or silicon borides is sprayed onto the ceramic surface, dried, and sintered at 2225° F. The resulting surface layer, however, appears to be susceptible to chipping and peeling.

According to U.S. Pat. No. 5,079,082, an external coating of a glass or a glass and ceramic is applied to the surface of the ceramic insulation and fired. A diffuse, graded interface is formed, which partially overcomes the problems of spallation and surface separation associated with forming a separate distinct layer on the surface, but improvements are still necessary.

A recent advance has provided a surface protective treatment that results in a protected surface having no discernible separate coating layer. Rather, the protective agents are incorporated into the body of the ceramic. U.S. Pat. No. 5,702,761 thus provides for impregnating a slurry containing a ceramic powder and a binding agent into the surface of a tile, and thereafter drying the slurry and firing the tile to effect binding of the ceramic powder particles into the pores of the ceramic tile. A protected tile with increased hardness and impact resistance is produced thereby addressing problems of surface separation and spallation.

The protected tile of U.S. Pat. No. 5,702,761 has a perceived drawback in that at temperatures above about 2000° F., the silica binding agent in the tile devitrifies or crystallizes, leading to a diminution of desirable properties of the tile.

It would thus be desirable to provide a method for protecting ceramic bodies that would give the advantages of having no discernible surface layer, but that would be able to resist even higher in-use temperatures. Another object of the invention is to provide a protected ceramic body that can withstand temperatures above those at which the silica binding agents of the prior art vitrify, especially above about 2000° F.

SUMMARY OF THE INVENTION

The present invention provides a porous ceramic body protected by a hardened surface, and a method for preparing the surface hardened ceramic body. The ceramic body is protected by applying to the surface of the porous ceramic body a slurry composition containing a binding agent, particles of a ceramic material, at least one boron containing compound, and a solvent. The inclusion of at least one boron containing compound in the slurry provides for hardened surfaces that are stable to higher temperatures as compared to those of the prior art.

The surface hardness of the ceramic body is significantly increased by the method of the invention, making it resistant to damage by mechanical and thermal shocks. In addition, because there is no interface between an identifiable surface coating and an underlying structure that can potentially de-bond, the protected ceramic body is not prone to failure from spallation or de-bonding at the surface. The method of the invention requires heating only to a moderate temperature. As a consequence, the protective treatment can be applied to the ceramic body as a repair without removing the ceramic body from its underlying structure.

In another embodiment, the invention provides a slurry composition useful for preparing ceramic bodies with protected surfaces that withstand high temperatures without failure. The slurry composition contains a binding agent such as silica particles, particles of a ceramic material, preferably cordierite, at least one boron containing compound, and a solvent that is preferably water.

A method is provided according to the invention to apply such an aqueous slurry to the surface of the ceramic body and impregnate the slurry into the pores of the ceramic in order to form the protected surface.

DETAILED DESCRIPTION OF THE INVENTION

The current invention represents an improvement over the process and compositions of U.S. Pat. Nos. 5,702,761 and 5,928,775 to DiChiara, the specification and drawings of which are expressly incorporated by reference. The improvement lies in the discovery that the inclusion of boron-containing compounds in the slurry of the invention leads to improved properties of the protected surfaces produced by applying the slurry.

The slurry composition of the invention contains particles of a binding agent, particles of a ceramic powder, particles of at least one boron containing compound, and a solvent component. A wide range of solvents can be used to prepare the slurry compositions of the invention. Water is the preferred solvent for environmental and cost reasons. The binding agent of the slurry preferably comprises silica colloidal particles in the size range of from about 4–150 nanometers. In a preferred embodiment, the silica particles are mixed with a carrier liquid such as water and contain a small amount of ammonia. The silica particles are typically present in an amount of from about 15 to about 50 parts by weight of the mixture of silica and carrier liquid. Such a mixture of silica and carrier liquid is known as a silica sol. Suitable silica sols of this type are commercially available. Other binders can be used, but are less preferred. For example, aluminum coated silica sols may be used to prepare the slurries of this invention. Mixtures of binders may also be used.

A ceramic powder is added to the slurry of the invention. The ceramic powder is preferably made of a ceramic material other than the ceramic material of the ceramic body to be protected. The powder consists of particles which preferably have been milled or otherwise comminuted to an average particle size of less than about 2 micrometers. The small particle size of the ceramic powder permits the particles to penetrate into the pores of the ceramic body during the subsequent application and firing steps. If there are larger particles that cannot penetrate into the pores, those particles are retained on the surface and are wiped away during the application procedure.

In a preferred embodiment, the ceramic powder is made of cordierite, having a molecular composition $MgAlSiO_3$. Other ceramics such as mullite, alumina, and zirconia, and mixtures of the various ceramics, can also be used. A corderite power having an average particle size of about two micrometers is available commercially.

The slurry compositions of the invention also contain one or more boron containing compounds suitable for blending into the slurry. In general, any boron containing compound may be used to prepare the slurries of the invention. Preferred compounds include those that are not soluble in water and do not produce an acid that can attack the ceramic insulation. Examples include, without limitation, boron carbide, boron butoxide, boron nitride, boron nitrate, and mixtures thereof.

To prepare the slurries of the invention, appropriate amounts of the binding agent, ceramic powder, boron containing compound, and solvent are simply mixed together. As noted above, it is preferred to add the silica particles as a silica sol of approximately 15–50 parts by weight silica particles in water. The particle size of the binding agent, ceramic powders, and boron compounds are preferably on the order of about 2 micrometers or less so as to be able to penetrate the tile surface.

Relatively lesser amounts of boron containing compounds are used in the slurry relative to the binding agent and ceramic material powders. Preferably the amount of boron containing compound in the slurry ranges from about 0.1% by weight up to about 10.0% by weight. In general, the ceramic powder is present in the slurry at from about 5 to about 40% by weight. The binding agent particles are present in the slurry at from about 60 to about 90% by weight. The balance of the slurry comprises water. In a preferred embodiment, a slurry composition is prepared which contains about 73% of silica sol, 26% of cordierite and 1% of a boron containing compound. A suitable silica sol for this application is commercially available as Nalco 2327, sold by Nalco Chemical Company. In a preferred embodiment, boron carbide ($B_4C$) is used as the boron containing compound.

After the ingredients of the slurry are mixed together as described, above, the slurry can be further mixed for example, in a high shear mixer or a ball mill. A typical high shear mixing is accomplished at about 3,000 rpm for about 3 minutes. A typical ball milling is accomplished in about 4 hours. The effect of the further mixing in the high shear mixer or ball mill is to break down agglomerated groups of powder particles, producing a good dispersion of the particles in the slurry.

In some applications of the slurry composition of the invention, it is desirable to modify the emissivity of the ceramic material so that the amount of heat introduced from the environment can be controlled. In such cases, known emissivity modifying agents such as silicon carbide and molybdenum disilicide can be provided in the slurry. In a preferred embodiment, silicon carbide powder can be added to the slurry. When present, silicon carbide powder is preferably substituted for about 10 to about 40% by weight of the ceramic material, such as cordierite, in the slurry. After subsequent processing with the slurry, the protected region of the ceramic body has a concentration of the silicon carbide or molybdenum disilicide that modifies its emissivity.

The resulting slurry, having a consistency similar to that of water, is applied to the ceramic body so as to impregnate the slurry into the pores of the ceramic body. The application is preferably performed with a mechanical contact pressure to aid in forcing the slurry into the pores, but may also be performed by non-contact techniques such as spraying. In a preferred embodiment, the invention provides for the slurry to be applied using a brush. The amount of the slurry actually introduced into the pores of the ceramic body is controlled by the amount that is applied to the surface during this application procedure. The amount of slurry and the amount of the powders in the slurry impregnated into the surface of the ceramic body can be closely controlled. The amount of slurry applied to the surface is preferably of an amount such that after drying or firing, there is an increase in weight of the ceramic body of from about 1 to about 6 grams per square inch of treated surface area. In a preferred embodiment, the invention provides for a slurry to be applied to a surface in an amount of about 3 grams per square inch of protected surface. This results in an increase of weight of the ceramic body, due to the dried and fired slurry material of about 2.2 grams per square inch.

After the desired amount of the slurry has been applied to the surface of the ceramic body, the slurry is dried at a temperature of about 180° F. to about 300° F., most preferably, about 300° F. The liquid in the slurry is released to the atmosphere during the drying process leaving a residual solid composed of ceramic particles, silica particles, and particles or residue of boron-containing compounds within the pores of the ceramic body. The term "drying the slurry" is used herein rather than "heating the ceramic body" because the drying can be accomplished by surface heating techniques such as heat lamps or heat guns without heating the entire ceramic body, if desired. Drying can also be accomplished by heating the entire ceramic body as in a furnace, or by letting the ceramic body dry at room temperature to remove the solvents.

After the solvent is removed, the nanometer sized silica particles bond to the fibers and powder in the pores of the ceramic body forming a dense hardened that is very damage resistant. The ceramic body is completed at this point and can be used. The surface is hard and tough and will not degrade even on re-exposure to a solvent such as water—the silica will not go back into suspension. Upon heating during use, the boron compound decomposes the silica, increasing the coating density, preventing the silica from devitrifying, and allowing the system not to degrade even at temperatures above 2000° F.

The ceramic body may optionally be fired after drying to decompose and react the boron-containing compound with the silica from the silica sol or the silicon fibers in the ceramic body at temperatures of about 1800° F.

The drying and firing steps can be conducted by heating the entire ceramic body to the required temperatures. Alternatively, the required temperatures can be achieved using a surface heating source such as a quartz heat lamp, heat guns, or blankets directed against the surface into which the slurry was applied. This latter capability permits in situ repair and patching of ceramic tiles without removing them from the underlying structure, such as an air frame, to which they are attached. That is, if a ceramic article such as a protective thermal tile is damaged during service, the protected surface of the present invention can be reformed by applying the slurry to the damaged area. High intensity lamps can be directed against the area to dry and to fire the ceramic mixture in the pores. The required temperatures to complete the drying are sufficiently low that the ceramic body protects the underlying structure from the heat. The coating is useable after the water from the slurry is dried out, for example, over the temperature range of 180° F. to 300° F.

For example, a tile with the slurry impregnated into its pores may be placed in an oven and the heat turned on. During the time the temperature is increasing through the temperature range desirable for drying, the solvent is dried from the tile and a dense hardened surface is formed on the ceramic body.

The coating of the invention has an additional advantage compared to a reactive cured glass coating—the surface is porous, which allows a new rapid spray-on water proofing to be easily applied to the surface of large areas of tile on large surface areas on vehicles.

Following treatment as described above to prepare a protected surface on the tile, it may be desirable to further treat the tile, for example, to seal the tile against water penetration or to apply a decorative coating. The processes and compositions of the invention are fully compatible with the use of such sealants and paints.

EXAMPLE

An aqueous slurry was prepared with 73% Nalco 2327 silica sol, 26% cordierite powder, and 1% boron carbide, wherein all percentages are by weight. The resulting slurry was further mixed in a high shear mixer at 3000 rpm for 3 minutes. The slurry was applied to the surface of a ceramic tile in an amount sufficient to increase the weight of the tile by 3 grams per square inch. Following application and impregnation of the slurry into the pores of the ceramic tile, the slurry was dried off at a temperature of about 300° F. for a period of 60 minutes. The dried tile was held at 2500° F. for 20 hours. The tile had no visible cracks and no de-lamination was observed.

COMPARATIVE EXAMPLE

The example was repeated, except that no boron carbide was used in the slurry. After twenty hours at 2500° F., cracks and de-lamination were observed in the tile.

The invention has been described with respect to particular preferred embodiments by way of illustration. Various modifications of the processes and compositions may become apparent upon reading the disclosure to those skilled in the art. It is intended that all such modifications within the scope of the appended claims are to be considered part of the current invention.

What is claimed:

1. A method for protecting a surface of and increasing the temperature stability of a porous ceramic body, comprising the steps of:
    applying to the surface a slurry composition comprising:
        a binding agent;
        a ceramic material different from the material of the ceramic body;
        at least one boron containing compound;
        solvent; and
    impregnating the slurry into the pores of the ceramic body wherein the ratio of boron compound to binding agent in the slurry is from 1:6 to 1:900, and wherein the method produces a porous ceramic body stable to higher temperatures than a porous ceramic body produced without the at least one boron containing compound.

2. A method according to claim 1, wherein the binding agent comprises silica particles.

3. A method according to claim 1, wherein the solvent comprises water.

4. A method according to claim 1, wherein the ceramic material comprises cordierite.

5. A method according to claim 1, further comprising the steps of:
    drying the slurry in the pores of the ceramic body; and
    firing the dried slurry in the pores.

6. A method according to claim 1, wherein the ceramic body is provided in the form of a tile.

7. A method according to claim 1, wherein the boron containing compound comprises boron carbide.

8. A method according to claim 1, wherein the slurry comprises boron carbide, cordierite, silica, and water.

9. A method according to claim 1, wherein the slurry further comprises molybdenum silicide or silicon carbide.

10. A method according to claim 1, wherein the boron compound in the slurry does not produce an acid that can attack the ceramic body.

11. A method according to claim 1, wherein the boron containing compound comprises a material selected from the group consisting of boron carbide, boron butoxide, boron nitride, and boron nitrate.

12. A method for producing a surface protected ceramic body, comprising:
    impregnating a slurry into the pores of a ceramic body; and
    drying the slurry in the pores of the ceramic body to produce the surface protected ceramic body;
    wherein the slurry comprises a boron-containing compound and further comprises a binding agent, a ceramic material different from the material of the ceramic body, and a solvent, wherein the ratio of boron compound to binding agent in the slurry is from 1:6 to 1:900, and wherein the surface protected ceramic body can be healed to 2500° F. for 20 hours without cracking.

13. A method according to claim 12, wherein the binding agent comprises silica and the solvent comprises water.

14. A method according to claim 12, wherein the ceramic material comprised cordierite.

15. A method according to claim 12, further comprising firing the dried slurry in the pores.

16. A method according to claim 15, wherein the firing step comprises directing a surface heating source against the surface.

17. A method according to claim 15, wherein the firing step comprises heating the entire ceramic body.

18. A method according to claim 12, wherein the drying step comprises directing a surface heating source against the surface of the ceramic body.

19. A method according to claim 12, wherein the drying step comprises heating the entire ceramic body.

20. A method according to claim 12, wherein the boron containing compound comprises boron carbide.

21. A method according to claim 12, wherein the boron compound in the slurry does not produce an acid that can attack the ceramic body.

22. A method according to claim 12, wherein the boron containing compound comprises a material selected from the group consisting of boron carbide, boron butoxide, boron nitride, and boron nitrate.

23. A method of preparing a surface hardened porous ceramic body comprising:

applying an aqueous slurry comprising boron carbide, silica, and cordierite to the surface of the ceramic body;

impregnating the slurry into the pores of the ceramic;

drying the slurry in the pores of the ceramic body; and firing the dried slurry in the pores, wherein the ratio of boron carbide to silica in the slurry is from 1:6 to 1:900.

24. A method according to claim 23, wherein the porous ceramic body is provided in the form of a tile.

25. A method according to claim 23, wherein the method produces a porous ceramic body stable to higher temperatures than a porous ceramic body produced without the at least one boron containing compound.

* * * * *